(12) United States Patent
Makkinejad (10) Patent No.: US 7,966,664 B2
(45) Date of Patent: Jun. 21, 2011

(54) ERROR AND EXCEPTION MESSAGE HANDLING FRAMEWORK

(75) Inventor: Babak Makkinejad, Troy, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 519 days.

(21) Appl. No.: 12/132,440

(22) Filed: Jun. 3, 2008

(65) Prior Publication Data

US 2009/0300774 A1    Dec. 3, 2009

(51) Int. Cl.
   *G06F 7/04*    (2006.01)
(52) U.S. Cl. ........................................... 726/26
(58) Field of Classification Search .................. 726/26
    See application file for complete search history.

(56) References Cited

U.S. PATENT DOCUMENTS

| | | | |
|---|---|---|---|
| 6,408,391 B1 | 6/2002 | Huff et al. | |
| 6,954,133 B2 * | 10/2005 | McGregor et al. | 340/5.26 |
| 2005/0041789 A1 | 2/2005 | Warren-Smith et al. | |

OTHER PUBLICATIONS

"Exception Handling," Wikipedia, [online], <http://en.wikipedia.org/wiki/Exception_handling>, retrieved Jan. 5, 2009, 9 pages.
Illco of Mayday Software Productions, "C++ Exception Handling," [online], <http://www.eastcoastgames.com/articles/cppexception.html>, retrieved Jan. 5, 2009, 3 pages.
"Java beginner.com, *Understanding Java Exceptions*," [online], <http://www.javabeginner.com/learn-java/understanding-java-exceptions>, retrieved Jan. 16, 2009, 5 pages.
"*Obfuscated Code*," Wikipedia, [online], <http://en.wikipedia.org/wiki/Obfuscated_code>, retrieved Feb. 6, 2009, 11 pages.
PreEmptive Solutions, "*NET Obfuscator and Java Obfuscator—Code Protection and Application Hardening*," [online], <http://preemptive.com/obfuscator.html>, retrieved Mar. 23, 2009, 2 pages.
*Intrusion Detection FAQ: What is a Honeypot?*, [online], <http://www.sans.org/resources/idfaq/honeypot3.php>, retrieved Mar. 23, 2009, 4 pages.
Honeypots, Intrusion Detection, Incident Response, "*Intrusion Detection, Honeypots and Incident Handling Resources*," [online], <http://www.honeypots.net/>, retrieved Mar. 23, 2009, 2 pages.
Spitzner, Lance, "*Honeypots, Definitions and Value of Honeypots*," May 29, 2003, Online, <http://www.tracking-hackers.com/papers/honeypots.html>, retrieved Mar. 31, 2008, 6 pages.
Spitzner, Lance, "*Problems and Challenges with Honeypots*," Jan. 14, 2004, Online, <http://www.securityfocus.com/print/infocus/1757>, retrieved Mar. 26, 2008, 4 pages.
"*Honeypot (computing)*," Wikipedia, Online, <http://en.wikipedia.org/w/index.php?title+Honeypot_%28computing%29&printable=yes>, retrieved Mar. 18, 2008, 6 pages.
Levine, John, et al, "*The Use of Honeynets to Detect Exploited Systems Across Large Enterprise Networks*," Proceedings of the 2003 IEEE Workshop on Information Assurance, United States Military Academy, West Point, NY, Jun. 2003, 8 pages.
Spitzner, Lance, "*Honeypots: Simple, Cost-Effective Detection*," Apr. 30, 2003 Online,<http://www.securityfocus.com/print/infocus/1690>, retrieved Mar. 31, 2008, 5 pages.

* cited by examiner

*Primary Examiner* — Jacob Lipman (57) ABSTRACT

Described are systems and methods for counteracting attempts at unauthorized use of information systems. An error message generated in response to an error in the information system is received, where the error message includes a set of information describing the error. The received error message is then translated into an obfuscated message, where the obfuscated message replaces at least a portion of the set of information describing the error with a set of alternative information. The obfuscated message is then presented to a user via a user interface.

21 Claims, 4 Drawing Sheets

ERROR AND EXCEPTION MESSAGE HANDLING FRAMEWORK

TECHNICAL FIELD

This present disclosure relates to computer security and, more particularly, to computer security for counteracting and misleading attempts to subvert computer programs.

BACKGROUND

Computer security imposes requirements on computer programs that are different from most system requirements, as the computer security requirements often take the form of constraints on what computer programs are not supposed to do. Generally, these negative requirements make computer security particularly challenging. Because application developers and designers find it difficult enough to simply develop computer programs that perform their tasks and operations properly, the negative requirements needed for computer security increase the already difficult task of application and system design. Furthermore, negative requirements are deceptively complicated to satisfy, and require exhaustive testing to verify, an impractical request for most computer programs. Among the many negative requirements for computer security are programming strategies for making computer programs and applications both dependable and resistant to subversion. In low security operating environments, applications must be relied upon to participate in their own protection. For many types of development, various sets of best practice guidelines for secure coding are available in order to make an application more resistant to malicious subversion or attack.

One of the best practices for secure coding is the proper handling of a system's errors and exceptions. The system must not only handle any and all possible errors and exceptions in such a way that the system's functionality is not negatively impacted by a system or application error, but the system must also provide sufficiently detailed information to developers, designers, and technicians that comprises adequate information to identify, locate, and correct the problem. In order to be useful, error and exception messages should provide detailed information to users describing or identifying the origin of the error or exception (e.g., an internal memory address, a software component name, a database table name, etc.), the type of error or exception (e.g., buffer overflow, memory error, database access error, etc.), the context of the error or exception, as well as any other relevant information describing the problem experienced. Detailed error and exception messages, while useful in debugging the system during the development and sustain phases, may be exploited by unauthorized and/or malicious users to attack or subvert the associated system by using the detailed information provided by the error or exception messages to identify vulnerable applications or components of the system.

In order to limit attacks made possible by detailed error and exception information, programmers and developers routinely perform additional work to hide critical or sensitive error and exception information by having the system or application return non-technical or generic error and exception messages. In most cases, developing non-technical and generic error messages requires additional strategizing, programming and development time, while also increasing the costs for the development phase of the system. Moreover, during the sustain phase, developers, programmers, and technicians must trace back from the non-technical or generic message to determine the meaning or relevance of the actual and far more useful technical error message. While protecting the sensitive information associated with the error or exception, requiring additional translation of the non-technical or generic message can severely delay the resolution of the problem while simultaneously incurring further costs.

In recent years, the computer security community has employed honey-pots as a preferred method of protection and intrusion detection. A honey-pot is a trap set to detect, deflect, or in some manner counteract attempts at unauthorized use of information systems. Generally, a honey-pot consists of a computer, application, data, or a network site that appears to be part of a network, but which is actually isolated, unprotected, and monitored, and which seems to contain information or a resource that would be of value to attackers. A honey-pot is valuable as a surveillance and early-warning tool. While often a computer, a honey-pot can take on other forms, such as files or data records, or even unused internet protocol (IP) address space. In general, honey-pots have no production value and thus should not see any legitimate traffic or activity. Whatever they capture and/or monitor can be assumed to be either malicious, unauthorized, or both. Any material monitored, detected, or trapped by the honey-pot can be categorized as illicit data or information and listed as such for future use.

SUMMARY

During the development and production stages of information systems, error and exception messages can be generated and used to provide information describing errors, exceptions, and other events that occur during the operation of a particular system. However, the detailed and sensitive nature of the information provided in some error and exception messages can provide information sufficient to make the information system susceptible to malicious and unauthorized activity. Systems and methods can be implemented to counteract attempts at unauthorized usage of error and exception messages in information systems.

In one general aspect, an error message generated in response to the occurrence of an error in the information system is received. The error message may comprise a set of information describing various details of the error. The received error message is translated into an obfuscated message, where the obfuscated message replaces at least a portion of the set of information describing the error with a set of alternative information. The obfuscated message is then presented to a user via a user interface.

Implementations can include one or more of the following features. The replaced portion of the set of information describing the error can be a set of information that provides a detailed description of the error. Additionally, the alternative information can describe a set of false error information. For instance, the set of false error information can be information that appears to be meaningfully related to an error that differs from the error associated with the received error message.

The details of one or more embodiments of the invention are set forth in the accompanying drawings and the description below. Other features of the invention will be apparent from the description and drawings, and from the claims.

DETAILED DESCRIPTION

Figure 1:
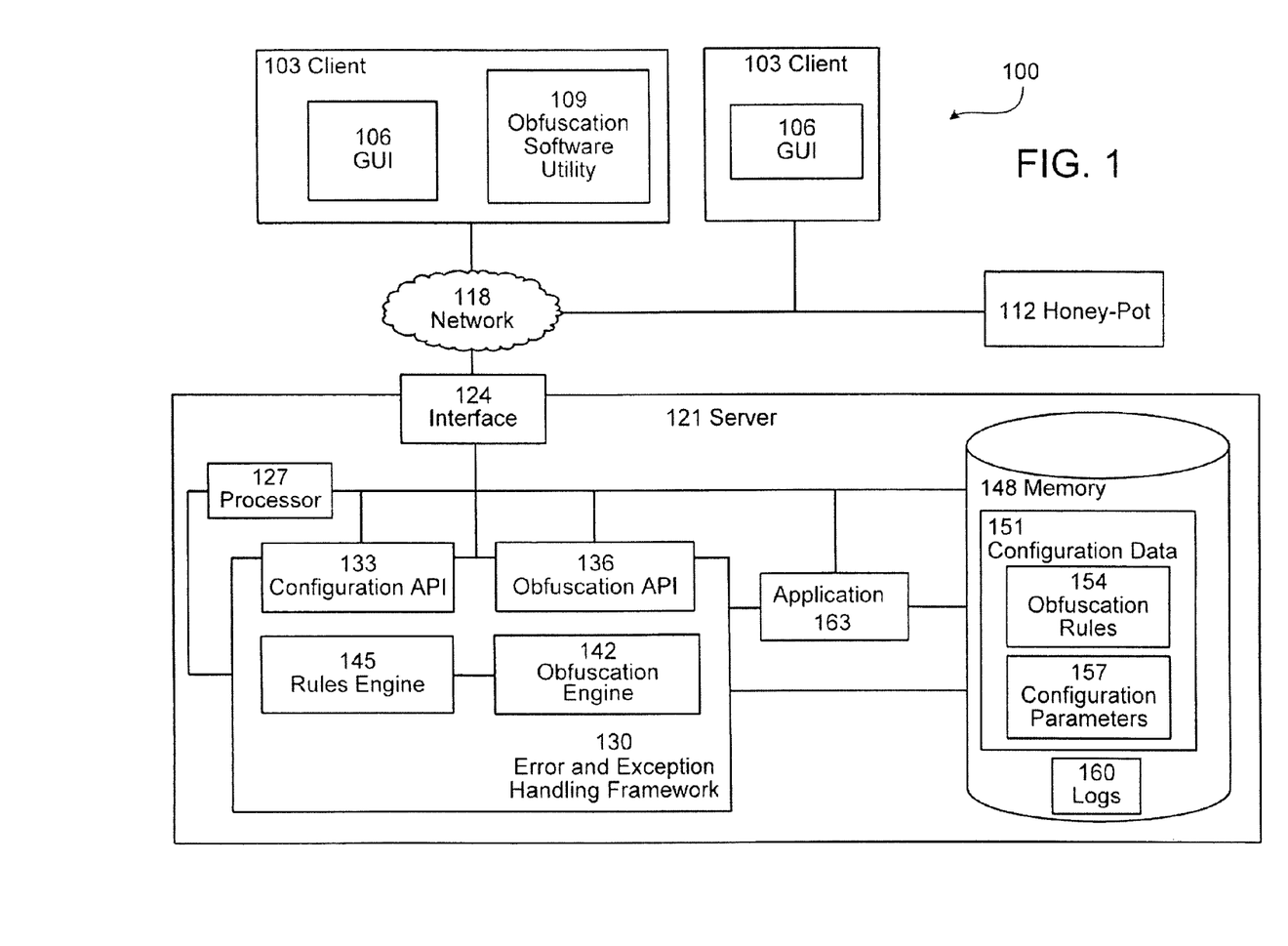
FIG. 1 illustrates a software environment that enables the use of detailed error and exception messages for a system while minimizing the risk of disclosing sensitive error or exception information that could be exploited by unautho

The present disclosure provides methods and systems for presenting detailed error and exception messages to authorized users while simultaneously protecting the sensitive information associated with those messages from exploitation and misuse by unauthorized or malicious users. FIG. 1 illustrates an environment 100 for the implementation of an error and exception message handling framework 130 in at least a portion of an enterprise or data processing environment. The error and exception message handling framework 130 allows developers and programmers to provide detailed error and exception messages to users without concern of disclosing sensitive and/or exploitable information to potential attackers and/or unauthorized users.

In particular, the methods and systems of the present disclosure address two challenges in the field of computer security. First, the error and exception message handling framework 130 allows developers and programmers to avoid the expense and effort involved in obfuscating and/or limiting the details of error and exception messages generated by a particular system or application. Instead of providing generic or unclear messages that purposefully limit the amount of useful information displayed in response to an error in order to prevent misuse or exploitation of such information, the framework 130 allows developers and programmers to include detailed information in error and exception messages such that authorized users can quickly and efficiently identify, locate, and correct any problems within the system or application. Second, while providing detailed information to authorized users, the framework 130 can supply unauthorized users with translated, or obfuscated, versions of the actual error and exception messages. These obfuscated error and exception messages can present false, although authentic-looking, error and exception information that not only obfuscates the actual information included in the original error and exception messages, but that can also mislead or direct the unauthorized user to perform actions allowing the system to trace or obtain information about the unauthorized user's identity, purpose, and/or location. Information on the unauthorized user traced or obtained by the system can then be used for counter-intelligence purposes, such as reporting the unauthorized user to the appropriate authorities or preventing future attacks.

As shown in FIG. 1, environment 100 includes, or is communicably coupled with, a server 121, one or more clients 103, a honey-pot system 112, and a network 118. The server 121 may include a memory 148, as well as one or more processors 127, and may be an electronic computing device operable to receive, transmit, process, store, or manage data associated with the environment 100. Generally, this disclosure provides merely one example of computers that may be used. As used in this document, the term "computer" is intended to encompass any suitable processing device. For example, the environment 100 may be implemented using computers other than servers, as well as a server pool. Indeed, the server 121 may be adapted or operable to execute any operating system including Linux, UNIX, Windows, Mac OS X, or any other suitable operating system. The server 121 may also include or be communicably coupled with a web server and/or a mail server.

Memory 148 may include any memory or database module and may take the form of volatile or non-volatile memory including, without limitation, magnetic media, optical media, random access memory (RAM), read-only memory (ROM), removable media, or any other suitable local or remote memory component. For example, memory 148 may store classes, frameworks, applications, backup data, business objects, jobs, or other information that includes any parameters, configuration values, variables, algorithms, instructions, rules, constraints, or references thereto. The memory 148 may also include any other appropriate data, such as virtual private network (VPN) applications, firmware logs and policies, firewall policies, a security or access log, print or other reporting files, HTML files or templates, and others.

Illustrated memory 148 includes a set of configuration data 151 associated with the error and exception handling framework 130. Although illustrated within memory 148 in FIG. 1, some or all of the set of configuration data 151 may be located outside the memory 148 and/or the server 121 in some implementations. As illustrated, the set of configuration data 151 includes a set of obfuscation rules 154 and a set of configuration parameters 157. The set of obfuscation rules 154 may include one or more rules providing the algorithms for how and when error and exception messages processed by the error and exception handling framework 130 are translated into obfuscated, or decoy, messages. Some rules may translate a small portion of the original message, such as a single word or numerical value, while other rules may translate a significant portion or, in some cases, all of the original message. The complexity and scope of the obfuscation rules 154 for each error and exception type may be based on a number of factors, including, but not limited to, the severity of the consequences if information within a particular error or exception message is exploited, the likelihood of an attempt to exploit the error or exception information in that particular message, and the level of sophistication of potential users likely to receive the particular message, among others. In some instances, the set of obfuscation rules 154 may specify that particular error and exception messages received by the framework 130 are not to be translated, regardless of whether the framework's 130 obfuscation functionality is active or disabled. Those messages will be presented by the framework 130 in their original format without translation. In most cases, those messages will be generic error and exception messages that typically do not contain exploitable information.

In general, the set of obfuscation rules 154 are meant to protect any error and exception message information that possibly could be exploited by malicious users, while providing unauthorized users with decoy messages that appear to be an authentic error or exception message. For instance, although translated, the decoy messages are meant to provide messages in the same or similar format as a normal error or exception message, but with information that, unbeknownst to an unauthorized user, is false and misleading. Thus, in most implementations, the decoy messages are meant to present a message that appears to be a genuine error or exception message generated by the system or application. By doing so, malicious users are kept unaware that any modification or translation of the original message has occurred, and that the decoy message represents a valid error or exception message. The decoy message can cause the malicious user to invest time and effort in a futile attempt to exploit non-existent or misleading errors. Further, for implementations where the decoy message leads the malicious user to one of the countermeasure systems described above, the framework 130 allows developers to study the malicious users' purposes or methods for future prevention and security, while also collecting valuable and incriminating information on the users' identities or locations.

In some implementations, the set of obfuscation rules 154 may be defined prior to integration of the error and exception handling framework 130 with any particular application 163. These predefined rules may be used with a broad spectrum of systems and applications, allowing for easy integration into a large number of environments 100. However, the framework 130 may also allow authorized users, developers, and programmers of a specific system or application to customize the set of obfuscation rules 154 by amending the existing obfuscation rules 154 or by adding new rules according to the particular implementation and intention of the framework 130. This allows different implementations of the framework 130 to include locale- or site-specific sets of obfuscation rules 154. In other words, the framework 130 may be adapted for a specific locale or language (e.g., English for the United States, French for France, German for Germany, etc.) as well as for a particular website or application 163, allowing for the creation of specialized sets of obfuscation rules 154 relevant and adapted to any particular implementation. This flexibility is useful when environment 100 includes countermeasures against unwanted attacks, such as honey-pots, honey-nets, or intrusion detection systems. For instance, one or more obfuscation rules may be defined that translate some or all of the original messages into decoy messages that include particular names, messages, and/or values designed to lead unauthorized users attempting to exploit the decoy messages to a particular countermeasure system, such as honey-pot system 112 illustrated in FIG. 1. When the unauthorized user attempts to exploit the decoy message information, such as by attacking a particular IP address or memory location provided in the decoy message, the countermeasure systems can trace or identify relevant information associated with the unauthorized user, including the user's identity, purpose, location, and method of attack. The information retrieved by the countermeasure systems can be used to (1) better prepare for and prevent future attacks and misuse and/or (2) notify the proper authorities or organizations of the unauthorized user's actions.

The set of obfuscation rules 154 includes rules for translating messages associated with various types of errors and exceptions generated by the system or application into decoy messages, the errors and exceptions including, but not limited to, buffer overflow errors, formatting errors, integer overflow errors, memory errors, application programming interface (API) function call errors, database access errors, database record (read, write, update, delete, etc.) errors, logical errors, and arithmetical errors, among others. In some implementations, different rules may be applied to different message types. For instance, one rule may apply to buffer overflow error messages while another rule applies to integer overflow errors. In some implementations, rules may translate the original message from one type of error or exception message to another. For instance, a database error message associated with a "referential integrity error" may be translated into a "parent-child relationship" error. Other rules may replace a portion of the information included within the original message with decoy information, such as by replacing the actual names of database tables and columns in a database access exception with legitimate-looking but incorrect and misleading names. Still another rule may apply a mathematical function to numerical data included within the error or exception message. For example, a rule may cause the translation of a range of memory addresses in a memory error message to a range of non-existent memory addresses in the decoy message by applying a predefined mathematical function adding, subtracting, multiplying, or dividing the numerical values by a certain amount or factor. In other instances, sets of numerical data for particular messages (e.g., memory ranges, IP addresses, etc.) may be substituted with a predefined set of numerical data corresponding to a countermeasure-protected location. In some instances, the rule may be associated with a complex mathematical formula to make attempts at translation difficult. In still other instances, a particular rule may define the translation of certain words or values in each message, regardless of the type of error represented. For example, one rule may require that each instance of the word "purchase" be translated to "sale," regardless of context or message type. Other appropriate word translations may also be applied. For instance, in order to protect a particular set of database tables or columns from unauthorized users, common language or naming conventions used for the set may be identified such that a single rule could be defined to translate and protect each of the items that may be included in an error or exception message.

The set of obfuscation rules 154 may also include a set of reverse rules for translating decoy messages back into their corresponding original error and exception messages. These reverse rules may be used by remote users who have received decoy messages, but who are authorized to view the error or exception messages as originally generated. The reverse rules may define how to reverse, or un-obfuscate, a particular decoy message into the corresponding original error or exception message. In some instances, the reverse rules may be the same rules as the normal rules used to produce the decoy messages. In those instances, the normal rule (or the algorithm associated with the normal rule) may be inverted or reversed in order to un-obfuscate the decoy message.

As illustrated in FIG. 1, the set of configuration data 151 also includes the set of configuration parameters 157 associated with the error and exception handling framework 130. The set of configuration parameters 157 stores information on the particular implementation of the framework 130 deployed in the environment 100. The configuration parameters 157 may be set to certain default values upon integration into each particular implementation. In certain implementations of the framework 130, the default values may be modified by authorized users or developers, and designed at any time according to a particular need. For instance, one parameter may define whether the obfuscation functionality of the error and exception handling framework 130 is in an active, disabled, or hybrid state. When the obfuscation functionality of the framework 130 is disabled, the original messages generated in response to errors and exceptions are presented without translation to users, both authorized and unauthorized. This state is best used during the development, production, and debugging stages, or when the system is inaccessible to unauthorized users. Developers and programmers can review the non-translated error and exception messages without fear of unauthorized users intercepting the messages during those times. When the functionality parameter is set to active, however, messages generated in response to errors and exceptions may be processed by the framework 130 to translate the messages into the appropriate decoy messages. In the hybrid state, both the originally generated and obfuscated versions of the error and exception messages are presented to the user. This option is valuable during development and debugging of the system, especially when ensuring that particular messages are being translated correctly.

Other configuration parameters 157 may include security or authorization levels for users. For instance, passwords, public key cryptography, and other authentication devices may be integrated into the error and exception handling framework 130. The security or authorization parameter may define which passwords or cryptographic keys are required to allow users to view the original messages or translate the decoy messages back to their original state. The same security information may also define which users are able to modify the set of configuration data 151, including modifying or adding to the set of obfuscation rules 154. Other relevant configuration parameters may also be stored or included in the set of configuration parameters 157. In some implementations, the parameters may be robust and highly customizable, while in other instances, they may be limited in scope and flexibility.

In some implementations, including illustrated FIG. 1, the memory 148 may include one or more logs 160 storing information related to the operations of the error and exception handling framework 130. For instance, the logs 160 may store information describing each translation performed by the framework 130, as well as any changes made to information in the set of configuration data 151, such as modifications to any obfuscation rule 154 or configuration parameter 157. The logs 160 may also store any information provided by or derived from users accessing the application 163. In some instances, the logs 160 may be used to store information related to the error messages received by both authorized and unauthorized users from the error and exception handling framework 130.

Illustrated server 121 also includes the processor 127. The processor 127 executes instructions and manipulates data to perform the operations of the server 121 such as, for example, a central processing unit (CPU), a blade, an application specific integrated circuit (ASIC), or a field-programmable gate array (FPGA), among others. Although illustrated as a single processor in the server 121, multiple processors 127 may be used in some implementations. In this particular illustration, processor 127 executes the application 163 and the error and exception handling framework 130.

Application 163 is any application, program, module, process, or other software that may execute, change, delete, generate, or otherwise manage information. Regardless of the particular implementation, "software" may include software, firmware, wired or programmed hardware, or any combination thereof as appropriate. The application 163 may be written or described in any appropriate computer language including, but not limited to, C, C++, Java, Visual Basic, assembler, Perl, Python, or any proprietary computer language, among others. The application 163 may include any number of sub-modules, such as a business application and various modules, but it may instead be a single multi-tasked module that implements its various features and functionality through various objects, methods, and other processes. Further, while described as internal to the server 121, one or more processes associated with the application 163 may be stored, referenced, or executed remotely. For example, a portion of the application 163 may be a local library or process, while another portion of the application 163 may be an object bundled for processing at a local or remote client 103. In another example, the majority of processes or modules may reside—or processing may take place—on the client 103. Moreover, the application 163 may be a child or sub-module of another software module or enterprise application (not shown). In some implementations, the application 163 may be accessed remotely by one or more clients 103. In another example, portions of the application 163 may be used by a user working directly at server 121. The application 163, while executing any of its methods, processes, or other operations, can identify any or all errors and exceptions that occur during execution. Once identified, messages describing those errors may be generated by either the application 163 itself or the server 121 on which the application 163 is executing. The generated error and exception messages are then passed or transmitted to the error and exception handling framework 130 for further processing. The application 163 may also be created solely as a honey-pot application associated with the framework 130.

As illustrated within server 121, application 163 is communicably coupled with the error and exception handling framework 130. The error and exception handling framework 130 may be any application, program, module, process, or other software that can execute the obfuscation functions and processes. In some implementations, the error and exception handling framework 130 may be a stand-alone application associated with the application 163, while in other implementations, the framework 130 may be embedded within or integrated with the application 163. The error and exception framework 130 may handle any, all, some, or none of the error and exception messages generated during execution of the application 163. Additionally, the framework 130 may be associated with two or more applications 163, simultaneously supporting each application 163 with the functionality described herein. The framework 130 may receive one or more error and exception messages from a particular application 163, translate at least one of the messages into a decoy message using the set of obfuscation rules 154 designed to obfuscate the actual error or exception information included in the original message, and communicate the decoy message to one or more users interacting with or executing the application 163. In some instances, the error and exception message handling framework 130 can supply and be associated with one or more sets of class libraries with bindings for one or more software programming languages or environments, including, but not limited to, C, C++, Java, .Net, PERL, and Python, among others. By providing multiple sets of class libraries, the error and exception message handling framework 130 may be compatible with applications 163 written in a plurality of programming languages.

The framework 130 may also be implemented within an Enterprise Service Architecture (ESA) environment, often termed a Service Oriented Architecture (SOA). In certain implementations, SOA can be considered a blueprint for an adaptable, flexible, and open IT architecture for developing services-based, enterprise-scale business solutions. The respective enterprise service is typically a series of web services combined with business logic that can be accessed and used repeatedly to support a particular business process. Aggregating such web services into business-level enterprise services may provide a more meaningful foundation for the task of automating enterprise-scale business scenarios. The composite application framework comprises design tools, methodologies, services and processes, an abstraction layer for objects, and user interface and process pattern libraries. The framework 130 may be bound to or a part of the composite application framework, where the composite application framework supports model-driven application composition, allowing a user to build applications with as little programming as possible, which often results in reduced development and deployment time for new/modified applications and business-pattern-oriented integration. For instance, the framework 130 could be utilized by developers who create an application by compositing the web services associated with the SOA into an entirely new system.

In the implementation of FIG. 1, the error and exception message handling framework 130 includes several components, including a configuration application programming interface (API) 133, a rules engine 145, an obfuscation engine 142, and an obfuscation API 136. In some implementations, the framework 130 may be a single module performing the functions of each component. In other instances, the framework 130 may include any number of separate components that combine to perform the framework's 130 operations. In still further implementations, the error and exception message handling framework 130 may perform only a portion of the operations described herein, using external modules to perform some of the operations associated with the framework 130 illustrated in FIG. 1. Each component may be embedded within or integrated with the error and exception message handling framework 130 as shown in FIG. 1, while in some instances some or all of the components may instead be communicably coupled to the framework 130 within server 121. In still other instances, each component may be a separate application located remote from the server 121, yet tightly integrated with the framework 130 through connections with the network 118.

The configuration API 133 encapsulates and, in some instances, automates the functionality of the framework 130 that is exposed to one or more users interacting with the framework 130 and application 163. Among its other functions, the configuration API 133 generates and exposes a configuration user interface (UI) to authorized users at clients 103 through each client's GUI 106. The configuration UI enables users to configure and set up the framework 130. For instance, a user who has provided the appropriate authenticating credentials can access and modify information within the configuration data store 151 using the operations encapsulated by the configuration API 133. For instance, the user may access the set of configuration parameters 157 through the configuration UI (e.g., by using a web browser associated with the GUI 106) to activate or disable the framework's 130 obfuscation functionality. Using the configuration UI, users can also review, modify, add rules to, or delete rules from the set of obfuscation rules 154 using the configuration UI. For example, an authorized user can use the configuration UI to access and modify the default list of obfuscation rules 154 to be a site- or locale-specific set of rules.

The configuration API 133 may also allow the framework 130 to dynamically modify its operations according to specific circumstances and/or specific periods of time. In one example, the configuration API 133 may determine whether a user associated with a particular client 103 is authorized to view the actual error and exception messages, or whether the user should be provided translated decoy messages. The configuration API 133 (or another component of the framework 130) may interact with the user associated with the client 103 (or other software associated with the client 103) to determine whether a particular user possesses or can provide a particular set of authenticating information necessary to qualify the user as an authorized user and thus able to view the original error and exception messages. The authenticating information used to determine whether the user is authorized may include a private key, password, IP address, user name, or any other appropriate authentication technique. Further, the configuration API 133 may also determine whether the user or client 103 is associated with the obfuscation software utility 109 described below, and as a result, authorized. If the configuration API 133 determines that the user is authorized, then the configuration API 133 may automatically modify the configuration parameters 157, such as by deactivating the obfuscation functionality for error and exception messages generated by an instance of the application 163 associated with the authorized user. If, however, the user cannot be authenticated, the configuration API 133 can set the configuration parameters 157 of the framework 130 such that any error or exception messages presented to the user are obfuscated decoy messages and not the originally generated error or exception messages.

Another component of the error and exception message handling framework 130 is the rules engine 145. The rules engine 145 accesses and interprets the set of configuration data 151, specifically, the set of obfuscation rules 154 and the set of configuration parameters 157. When the framework 130 receives an error or exception message from the application 163, the rules engine 145 analyzes the set of configuration parameters 157 (e.g., whether the obfuscation functionality of the framework 130 is active) and the set of obfuscation rules 154 to determine which rules are to be used in obfuscating the particular error or exception message received. In some instances, the rules engine 145 may use the connections between the error and exception handling framework 130 and memory 148 to access the set of configuration data 151, while in other instances, the rules engine 145 may use the functionality of one or more framework APIs to access the set of configuration data 151. If the obfuscation functionality is active, the rules engine 145 accesses the set of rules 154 and retrieves the appropriate rule to be applied to the message. In some instances, the rules engine 145 may retrieve the rules to be used when un-obfuscating a particular message. In those instances, the rules engine 145 may search for a reverse rule stored in the set of obfuscation rules 154, or, in other instances, the rule used to generate the decoy message. The retrieved rules and other relevant information are then sent to the obfuscation engine 142.

The obfuscation engine 142 receives one or more rules from the rules engine 145 through the internal connections of the framework 130, where each received rule is associated with one or more error and exception messages generated by or associated with the application 163. Using the received rules, the obfuscation engine 142 translates each of the one or more error and exception messages received by the framework 130 into one or more decoy messages to be presented to the one or more clients 103. In certain instances where the client 103 associated with the error or exception message is an authorized user, or if the framework 130 is in its disabled state, the obfuscation engine 142 will not translate the one or more messages into decoy messages. In those instances, the framework 130 may simply pass the non-obfuscated message directly to the user for review. Similarly, the obfuscation engine 142 may also translate decoy messages into the original error and exception messages when the error and exception message handling framework 130 performs its un-obfuscation operations.

The obfuscation API 136 provides a set of classes and methods that may be used to invoke the obfuscation features of the framework 130 using various programming languages and operating environments. For instance, the obfuscation API 136 may provide bindings for several programming languages or environments, including C, C++, Java, .Net, Python, and Perl, as well as others. Using the bindings, the framework 130 may by integrated with, or accessed by, a wide range of applications 163 and environments written in one or more of the several programming languages. The obfuscation API 136 can provide standard interfaces to be used by the applications 163 when accessing and harnessing the functionality of the framework 130. While described as having a plurality of programming language bindings, some implementations of the obfuscation API 136 (and in turn, the framework 130) may only be compatible with a single programming language. Additionally, the obfuscation API 136 may include bindings for any appropriate programming language, including languages others than those included above.

Additionally, server 121 includes interface 124 for communicating with other computer systems over network 118, such as one or more clients 103, the honey-pot system 112, or other servers (not shown) in a client-server or other distributed environment. Generally, interface 124 comprises logic encoded in software and/or hardware in a suitable combination and operable to communicate with the network 118. More specifically, interface 124 may comprise software supporting one or more communication protocols such that the network 118 or hardware is operable to communicate physical signals.

The network 118 facilitates wireless or wireline communication between the server 121 and any other local or remote computer, such as the one or more clients 103 or the honey-pot system 112. Indeed, while illustrated as a single network, network 118 may be a discontinuous network, so long as at least a portion of the network 118 may facilitate communications between senders and recipients. The network 118 may be all or a portion of an enterprise or secured network. In some instances, a portion of the network 118 may be a virtual private network (VPN) merely between the server 121 and the client 103 across a wireline or wireless link. Such an example wireless link may be via 802.11a, 802.11b, 802.11g, 802.20, WiMax, or other types of wireless links. In other words, the network 118 encompasses any internal or external network, networks, sub-network, or combination thereof operable to facilitate communications between various computing components in and outside the environment 100. The network 118 may communicate, for example, Internet Protocol (IP) packets, Frame Relay frames, Asynchronous Transfer Mode (ATM) cells, voice, video, data, and other suitable information between network addresses. The network 118 may include one or more local area networks (LANs), radio access networks (RANs), metropolitan area networks (MANs), wide area networks (WANs), all or a portion of the Internet, and/or any other communication system or systems at one or more locations. In certain implementations, the network 118 may be a secure network associated with the enterprise and certain local or remote clients 103.

The clients 103 may be any computer devices operable to connect or communicate with server 121 or the network 118 using a wireless or wireline connection. At a high level, a client 103 can include the GUI 106 and, in some instances, a copy of the obfuscation software utility 109. The client 103 comprises an electronic computing device operable to receive, transmit, process, and/or store any appropriate data associated with the application 163 and the error and exception handling framework 130. There may be any number of clients 103 communicably coupled to the server 121 at any point in time. For example, the environment 100 may include two local clients 103 (as illustrated in FIG. 1), a single client, or any number of additional clients internal or external to the illustrated portion of the network 118. Further, "the client 103," "developer," "programmer," and "user" (sometimes referred to as an "authorized user") may be used interchangeably as appropriate without departing from the scope of this disclosure. For example, the user may access a first instance of the application 163 on a first client 103, while a developer may use a second instance of the application 163 on a second client 103. Moreover, for ease of illustration, each client 103 is described in terms of being used by one user. More than one user may use one computer, or one user may use multiple computers. The client 103 can be a personal computer, touch screen terminal, workstation, network computer, kiosk, wireless data port, smart phone, personal data assistant (PDA), one or more processors within these or other devices, or any other suitable processing device. For example, the client 103 may be a computer that includes an input device, such as a keypad, touch screen, mouse, or other device that can accept information, and an output device that conveys information associated with the operation of the server 121 or the clients 103, including digital data, visual information, or the GUI 106. Both the input device and the output device may include fixed or removable storage media, such as a magnetic computer disk, CD-ROM, or other suitable media to both receive input from and provide output to users of the clients 103 through the display, namely, the GUI 106.

GUI 106 is a graphical user interface operable to allow the user of the client 103 to interface with at least a portion of environment 100 for any suitable purpose such as to allow the client 103 to interact with the application 163 and/or the error and exception handling framework 130. Generally, the GUI 106 provides the client 103 with an efficient and user-friendly presentation of data provided by or communicated within the system. In particular, the GUI 106 may provide users of the application 163 with access to data stored within the memory 148. The GUI 106 may include a plurality of user interface (UI) elements such as interactive fields, pull-down lists, and buttons operable at the client 103. These UI elements may be related to a configuration UI associated with the error and exception handling framework 130, as well as the functions of the application 163. In one implementation, the GUI 106 may provide a centralized and interactive display capable of presenting error and exception messages (both original and decoy) to users in response to one or more errors and exceptions occurring during execution of application 163, or the configuration UI associated with the configuration API 133 that allows authorized users to activate and/or disable the framework 130, as well as review, add, modify, and delete the stored configuration data 151 of the framework 130. In other implementations, the GUI 106 may provide a view displaying other relevant data and information associated with the error and exception handling framework 130 and/or the application 163. Moreover, the term "graphical user interface," or GUI, may be used in the singular or in the plural to describe one or more graphical user interfaces and each of the displays of a particular graphical user interface. Therefore, the GUI 106 can be any graphical user interface, such as a generic web browser, touch screen, or command line interface (CLI) that processes information in the environment 100 and efficiently presents the results to the user. The server 121 can accept data from the clients 103 via the web browser (e.g., Microsoft Internet Explorer or Mozilla Firefox) and return the appropriate HTML or XML responses using the network 118.

Further, some or all of the clients 103 may include an obfuscation software utility 109 associated with the error and exception handling framework 130. In some instances, and as illustrated in FIG. 1, only some clients 103 may include, contain, or be associated with the obfuscation software utility 109. Those may be limited to clients 103 associated with authorized users such as developers, programmers, and technicians working on the development or maintenance of the application 163. For some clients 103 including the obfuscation software utility 109 and associated with two or more users, each user of the client 103 may have access to the obfuscation software utility 109. In other instances, however, only particular users of the client 103 may have access to the utility 109. Such user access may require entry or association with the appropriate security or authorizing information, such as the use or entry of authorized username/password combinations or the possession of an appropriate private key.

In general, the obfuscation software utility 109 may be an agent, daemon, object, service, plug-in, or other software that allows the client 103 to in some instances initially receive the original message from the framework 130, and in other instances to translate decoy messages received from the error and exception handling framework 130. In some instances, the utility 109 may also be used to obfuscate original error and exception messages received at the client 103, such as when the obfuscation functionality of the framework 130 is inactive. By using the utility 109 to obfuscate the original messages generated by the application 163 or server 121, users may test that the translations provided by the framework 130 are accurate and sufficiently misleading and obfuscating. In particular instances, the obfuscation software utility 109 may perform similar functions to those performed by the error and exception handling framework 130. For instance, the obfuscation software utility 109 may independently access the set of obfuscation rules 154 across network 118 and perform at least a subset of the obfuscation functionality associated with the framework 130. Specifically, the obfuscation software utility 109 may allow users to translate one or more decoy messages that were previously obfuscated by the error and exception message handling framework 130 back into their original message. The obfuscation software utility 109 can be used when the framework 130 is active and the client 103 receives a decoy message through the GUI 106. The obfuscation software utility 109 may be used for a plurality of purposes, including examining the framework's 130 output in response to a particular error or exception, as well as other developmental and program debugging purposes. By studying the outputs, developers may adjust the set of obfuscation rules 154 to generate the appropriate decoy messages prior to deployment of the framework 130. Further, the functionality and output of the framework 130 can be reviewed and confirmed prior to deployment of the framework 130 in new systems. In the particular implementation of FIG. 1, the obfuscation software utility 109 may be located only on clients 103 associated with users authorized to interact with the framework 130, such as developers, programmers, and technicians. Unless the framework 130 is configured to display the original message, only users with access to the obfuscation software utility 109 are able to view the original error and exception messages generated by the application 163.

In some instances the obfuscation software utility 109 may include components analogous to those described in the framework 130, such as a rules engine for accessing and retrieving rules from the set of obfuscation rules 154 and an obfuscation engine 142 for obfuscating and un-obfuscating error and exception messages. In those instances, the obfuscation software utility 109 may access the relevant information in memory 148 using the network 118 in a manner similar to the framework 130. In other instances, the obfuscation software utility 109 may access the framework 130 through network 118, using the components of the framework 130 to obfuscate and un-obfuscate messages received at GUI 106.

In alternative implementations, the obfuscation software utility 109 may be located in, a component of, or a portion of one or more of the previously-described components of the error and exception handling framework 130. In those instances, authorized users associated with a particular client 103 can supply authorizing credentials (i.e., a username and password, a public key infrastructure (PKI) certificate, use of a known IP address, etc.) to notify the error and exception message handling framework 130 that the user associated with a particular instance of the application 163 is authorized to view the original, non-translated error and exception messages. In those instances, the authorizing credentials may be supplied to the error and exception handling framework 130, which evaluates the credentials to determine whether the application's 163 error and exception messages should be obfuscated for that particular user. This alternative may allow authorized users accessing the application 163 from any location, internal or external to environment 100, to view or access the non-obfuscated messages. In those instances, each user may be considered unauthorized until the appropriate identifying credentials are presented to and verified by the error and exception handling framework 130.

Environment 100 may further include a honey-pot system 112. The honey-pot system 112 can be any resource, such as a server or other computer, with little or no production value. In other words, the honey-pot system 112 is a system that should see minimal traffic, as it is not associated with any legitimate activity. Any interaction with the honey-pot system 112 can thus be recognized as or assumed to be unauthorized or malicious activity. In particular instances, the honey-pot system 112 may be either a low-interaction or a high-interaction honey-pot system. Low-interaction honey-pot systems have limited interaction, and normally work by emulating services and operating systems. High-interaction honey-pot systems are complex solutions involving real operating systems and applications. In general, low-interaction honey-pot systems can capture limited information from attackers and unauthorized users while high-interaction honey-pot systems can capture detailed information. The honey-pot system 112 of FIG. 1 may be used to capture information from unauthorized users attempting to exploit the information included within the decoy messages generated by the error and exception handling framework 130. For example, the obfuscation rules 154 may be defined such that the generated decoy messages include error information leading the unauthorized user to attempt to access information on the honey-pot system 112, when in fact the original error message describes information related to the server 121. When the unauthorized user accesses the honey-pot system 112, the functionality of the honey-pot system 112 can be used to trace and gather information on the unauthorized user's identity, purpose, and location. By combining the honey-pot system 112 with the error and exception handling framework 130, the system of FIG. 1 provides a system for securing error and exception messages generated by the application 163, but also providing counter-defenses against malicious users attempting to attack the application 163 and its related system.

Figure 2:
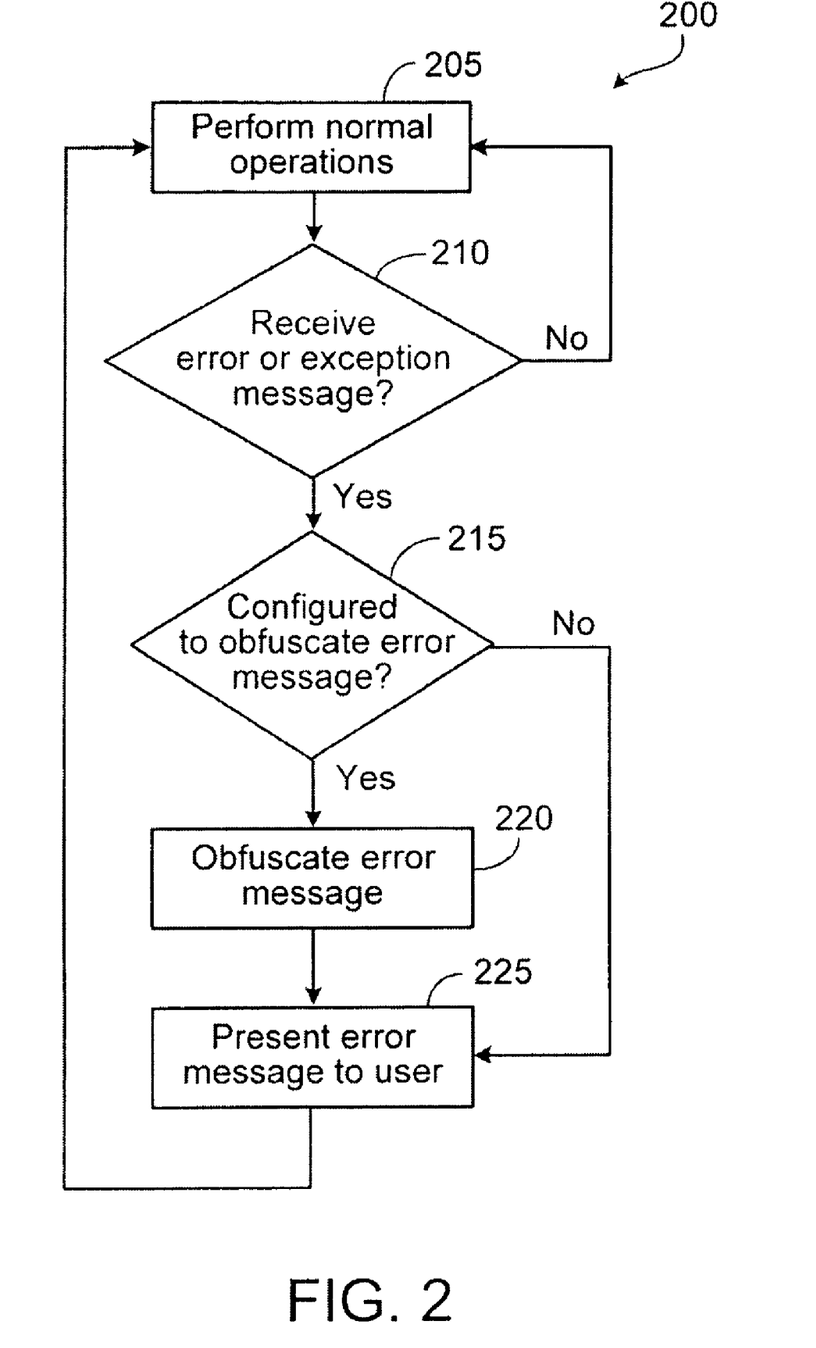
- FIG. 2 is a flowchart illustrating one example of a process for handling one or more error and exception messages.

FIG. 2 is a flowchart illustrating an example process 200 for processing error and exception messages. At 205, normal operations of a system are performed. For instance, the error and exception message handling framework 130 can perform its normal operations, such as its standard interaction with application 163 and the one or more clients 103. At 210, it is determined whether an error or exception message has been received. For example, the framework 130 may determine whether an error message has been received from the application 163 or the server 121. If no error or exception message is received, then the process 200 returns to 205 and continues with normal operations. However, if an error or exception message is received at 210, then at 215 it is determined whether the process is configured to obfuscate the error or exception message. For example, to determine whether the error and exception handing framework 130 is configured to obfuscate the received message, the framework 130 may use its functionality to access the set of configuration parameters 157 (illustrated in FIG. 1) to determine whether the framework's 130 obfuscation functionality is set to an active or hybrid state. Additionally, the framework 130 may also determine whether the client 103 associated with the particular instance of the application 163 is authorized to view the originally generated error and exception messages generated by the server 121 or the application 163, or whether the client 103 is to receive only obfuscated messages. This determination may include a determination of whether the client 103 is associated with a copy of the obfuscation software utility 109 or some other authenticating credentials, such as an authorizing user name and password combination or predefined IP address. If it is determined that the process is not to obfuscate received messages, then process 200 continues at 225 where the non-obfuscated original messages are presented to a user such as client 103. However, if it is determined that the error or exception message should be obfuscated, then at 220 the error or exception message is obfuscated into the corresponding decoy message. Once the decoy message is generated, at 225 the decoy message is presented to the user. The decoy message can be generated such that it appears to present meaningful error information (e.g., the message is structured in a manner similar to the original message), but that in fact misleads the user as to the true nature and information associated with the actual error or exception message. If the message has not been obfuscated, the user receives the actual error message containing the original error or exception message generated in response to the error associated with the application 163, including any sensitive information used to describe the type and location of the issue. Once the message has been presented, process 200 returns to 205 to perform normal operations.

Figure 3:
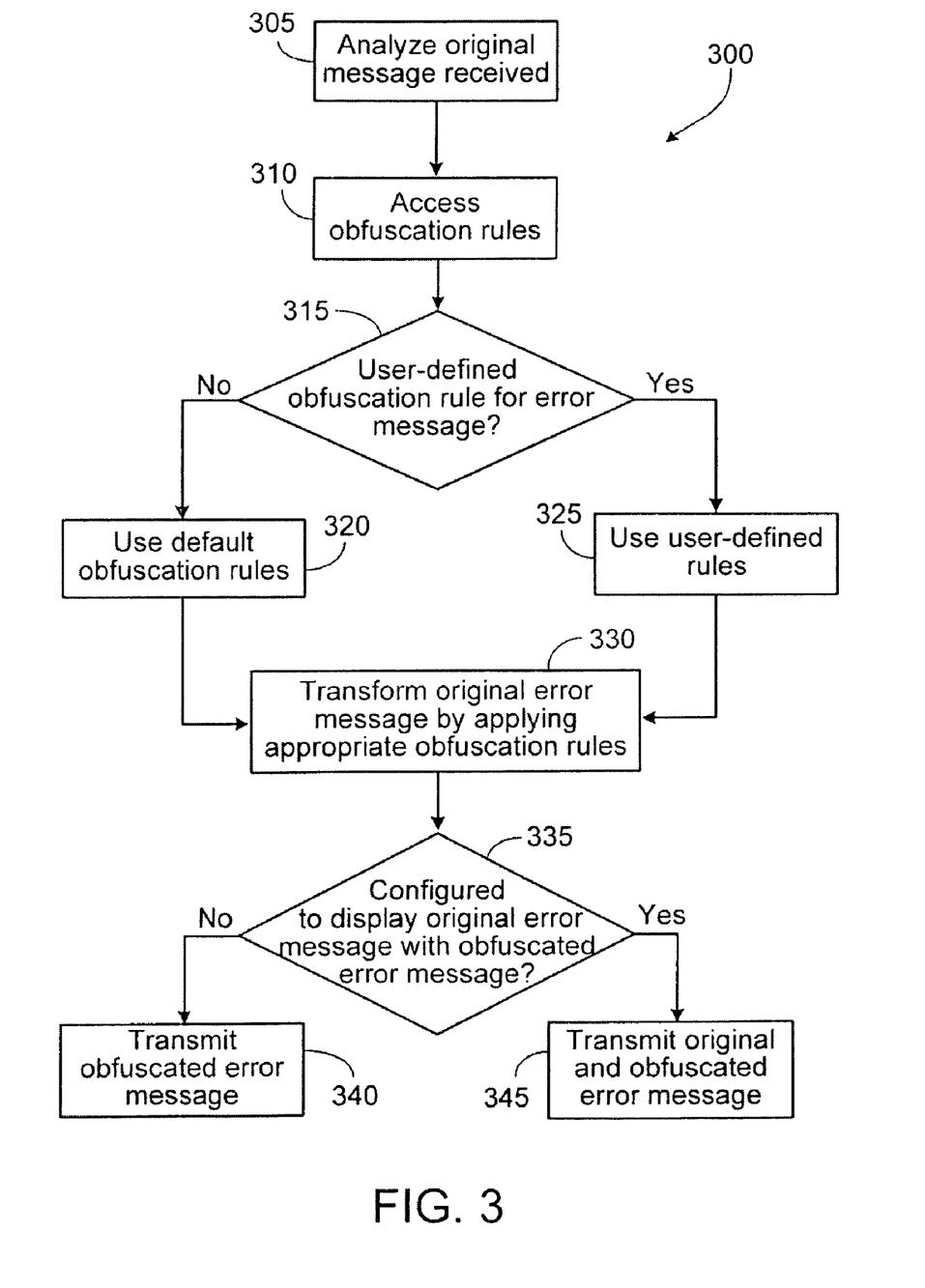
FIG. 3 is a flowchart illustrating one example of a process for translating an original error or exception message into an obfuscated error or exception message.

FIG. 3 describes the obfuscation operation 220 of FIG. 2 in greater detail. In general, the obfuscation process 300 begins after the determination at 215 of FIG. 2 that the message received is to be obfuscated. At step 305, the original message is analyzed. The analysis of 305 may include determining the type of error that has been received (e.g., a buffer overflow error, a memory error, a database access error, etc.), the information included within the error (e.g., the addresses, databases, or database tables where the error occurred), as well as other information relevant to the obfuscation process.

Once the message is analyzed, at 310 a set of obfuscation rules are accessed to determine the appropriate rules to be applied during the message's translation. In some instances, the rules engine 145 component (illustrated in FIG. 1) may access the obfuscation rules 154. While accessing the rules, at 315 it is determined whether a user-defined obfuscation rule exists for the particular message received. In some examples, the framework 130 of FIG. 1 accesses the set of obfuscation rules 154 to determine if any users have overwritten or modified the default obfuscation rules for the type of error or exception message received. If no user-defined rule exists for messages of the type received, then process 300 retrieves the default rule from the set of obfuscation rules at 320. Alternatively, if a user-defined rule does exist, at 325 the process 300 retrieves the appropriate user-defined rule to be used for translating the received message.

At 330, the rule retrieved from the set of obfuscation rules is used to transform the original error or exception message into the obfuscated decoy message. The transformation operation may be performed by the obfuscation engine 142 illustrated in FIG. 1 using the appropriate rule received from the rules engine 145. At 335, process 300 determines the appropriate configuration for displaying the decoy message. For example, the framework 130 may access the set of configuration parameters 157 to determine the display configuration of the framework 130. While operation 215 of FIG. 2 confirmed that the message should be obfuscated, it is determined at 335 whether the display configuration is set to display the obfuscated message alone (i.e., the active state), or whether the original message is to be displayed along with the obfuscated message (i.e., the hybrid state). If, at 335, the process determines that the configuration is set to the active state, then at 340 only the obfuscated error or exception message is transmitted for display. On the other hand, if configured to the hybrid state, then at 345 both the obfuscated message and the original message are transmitted for display. Once the process 300 is complete, processing continues at 225 of FIG. 2.

Figure 4:
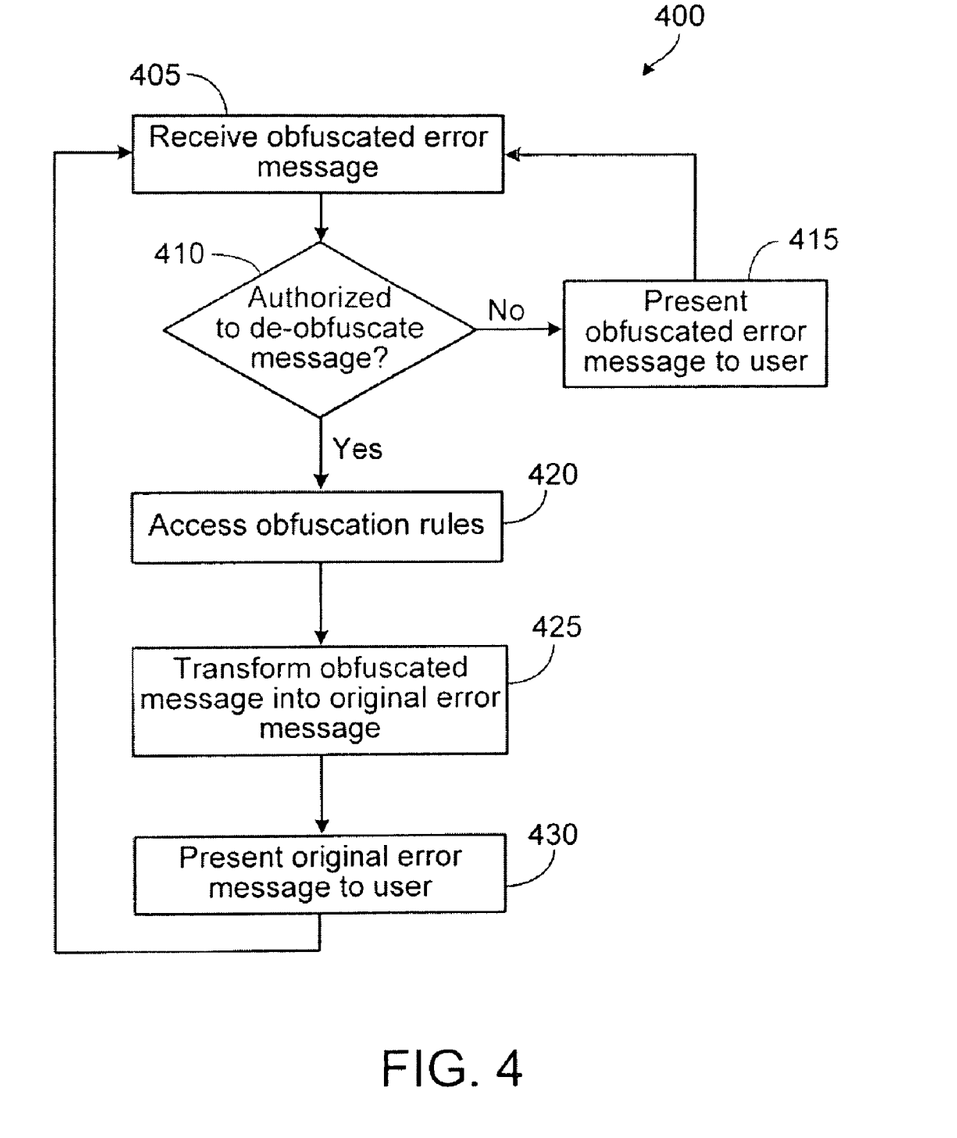
FIG. 4 is a flowchart illustrating one example of a process for translating an obfuscated error or exception message into the original error or exception message.

FIG. 4 illustrates process 400 for interacting with and translating the obfuscated messages received into their corresponding original messages. In some instances, process 400 may be implemented when the framework 130 of FIG. 1 is in its active state such that only obfuscated messages are provided to the client 103 by the framework 130. At 405, an obfuscated error message is received (e.g., by the client 103) in response to an error or exception message being generated (e.g., by the application 163 or the server 121). At 410, it is determined whether or not a user or system receiving the obfuscated error message is authorized to de-obfuscate the decoy message and view the original message. In some instances, the determination of whether the user is authorized to view the original message is based on whether a client 103 associated with the user includes a copy of the obfuscation software utility 109. In those instances, the presence of the obfuscation software utility 109 indicates that users of clients 103 that include the utility 109 are authorized to view and interact with the original error and exception messages. Conversely, the absence of the obfuscation software utility 109 may indicate that users are not authorized to view the original message and thus cannot translate the received message into the originally generated message containing the actual error or exception information. In some instances, only specific users of a client 103 may be sufficiently authorized to use the obfuscation software utility 109, such that the mere presence of the utility 109 on the client 103 alone may not be enough for each user to view the original message.

If it is determined that the user is not authorized to view the original message, then at 415 the obfuscated error or exception message received at 405 is presented to the user. The obfuscated message represents the decoy message meant to provide an authentic-looking, but misleading, message to counter attempts to exploit information included in detailed error and exception messages. Once the obfuscated message has been presented, process 400 returns to 405 to wait for a new error or exception message to be received. If the user is determined to be authorized to view the original message at 410, process 400 continues at 420, where the set of relevant obfuscation rules 154 are accessed to determine the rules used to transform the original message in the decoy, or obfuscated, message. For instance, the obfuscation software utility 109 may use its functionality to access the set of obfuscation rules 154 located at the server 121. Similar to the rules engine 145 described with regard to FIG. 1, the obfuscation software utility 109 accesses the rules and determines, according to the obfuscated message received, which rules were used to transform the original message into the current decoy message.

At 425, the obfuscated message is transformed into the originally generated error or exception message using the appropriate rules identified during the accessing of the set of obfuscation rules. For example, the obfuscation software utility 109, based on the decoy message received at 405, can identify the appropriate algorithm necessary to de-obfuscate the decoy message at 420, and then transform the obfuscated message into the originally generated message at 425. To transform the obfuscated message, the obfuscation software utility 109 may apply functionality similar to that described for the obfuscation engine 142 of the error and exception handling framework 130. Once the decoy message has been transformed into the original message, the original error message is presented to the user at 430. In some instances, the obfuscation software utility 109 may present the original error or exception message to the GUI 106 of client 103 for review by the user. After the original message has been presented, process 400 returns to 405 and awaits receipt of the next obfuscated message.

In some alternative implementations of FIG. 4, the obfuscated message may initially be presented to each user, regardless of whether the user is authorized to view the original message. In those instances, authorized users can, but are not required, to request the translation of the decoy message into the original message. Process 400 may be initialized manually by a user wanting to view the original message. Further, the obfuscation software utility 109 may be used to enable a user to obfuscate messages at will for the purpose of investigating the outputs of the obfuscation process and for adjusting those messages before deployment of the framework 130 in any system. In those instances, the client 103 may initially receive the original message at 405. Instead of determining whether the client 103 is authorized to de-obfuscate the message, process 400 determines whether the client 103 is authorized to obfuscate the message. The rest of the steps may be similarly adapted such that the original message is translated by the obfuscation software utility 109 into the appropriate decoy message, allowing users to test the obfuscation functionality of the framework 130.

A number of embodiments of the present disclosure have been described. Nevertheless, it will be understood that various modifications may be made without departing from the present disclosure. For example, the present disclosure is not meant to be a server-specific solution. Alternate and "lightweight" versions of the error and exception message handling framework 130 can be developed and deployed on various information systems and appliances, such as kiosks, cell phones, mobile devices, personal computers, and so forth. While the delivery of the full server capability may not be achievable on certain platforms, the delivery of the core functions for obfuscation can be adapted to alternative implementations. Further, the internal algorithms for obfuscation and un-obfuscation described with regard to the illustrated implementations may be modified or replaced. For example, a modular set of obfuscation rules 154 may be used to allow for enhanced portability of a particular set of obfuscation rules and functionality. Accordingly, other embodiments are within the scope of the following claims.

What is claimed is:

1. An information-system-implemented method for counteracting attempts at unauthorized use of an information system comprising:
receiving an error message using an information system generated in response to an error in the information system, the error message comprising a set of information describing the error;
translating the received error message into an obfuscated message using the information system, wherein the obfuscated message replaces at least a portion of the set of information describing the error with a set of alternative information, and wherein the set of alternative information describes a set of false error information; and
presenting the obfuscated message to a user via a user interface using the information system.

2. The method of claim 1 further comprising:
receiving a second error message generated in response to a second error in the information system, the second error message comprising a set of information describing the second error; and
presenting the second error message to the user via the user interface.

3. The method of claim 1, wherein the replaced portion of the set of information describing the error comprises a set of information providing a detailed description of the error.

4. The method of claim 1, wherein translating the received error message into the obfuscated message comprises:
applying an obfuscation rule associated with the received error message to the portion of the set of information describing the error to generate the set of alternative information; and
replacing the set of information describing the error with the set of alternative information.

5. The method of claim 1, further comprising:
determining whether the user is authorized to view the generated error message; and
if the user is authorized to view the generated error message, translating the obfuscated message into the original error message, where the original error message replaces the set of alternative information with the replaced portion of the set of information describing the error.

6. The method of claim 5, wherein determining whether the user is authorized to view the generated error message comprises determining whether the user is an authorized user of the information system.

7. The method of claim 1, wherein the set of false error information comprises information that appears to be meaningfully related to an error that differs from the error associated with the received error message.

8. The method of claim 7, wherein the set of false error information is adapted to mislead the unauthorized user from the error associated with the received error message.

9. The method of claim 7, wherein the set of false error information comprises a set of information associated with a honey-pot system.

10. An article comprising a machine-readable medium storing instructions for causing one or more processors to perform operations comprising:
receiving an error message generated in response to an error in the information system, the error message comprising a set of information describing the error;
translating the received error message into an obfuscated message, wherein the obfuscated message replaces at least a portion of the set of information describing the error with a set of alternative information, and wherein the set of alternative information describes a set of false error information; and
presenting the obfuscated message to a user via a user interface.

11. The article of claim 10 wherein the machine-readable medium storing instructions for causing one or more processors to perform further operations comprising:
receiving a second error message generated in response to a second error in the information system, the second error message comprising a set of information describing the second error; and
presenting the second error message to the user via the user interface.

12. The article of claim 10, wherein the replaced portion of the set of information describing the error comprises a set of information providing a detailed description of the error.

13. The article of claim 10, wherein translating the received error message into the obfuscated message comprises:
   applying an obfuscation rule associated with the received error message to the portion of the set of information describing the error to generate the set of alternative information; and
   replacing the set of information describing the error with the set of alternative information.

14. The article of claim 10 wherein the machine-readable medium storing instructions for causing one or more processors to perform further operations comprising:
   determining whether the user is authorized to view the generated error message; and
   if the user is authorized to view the generated error message, translating the obfuscated message into the original error message, where the original error message replaces the set of alternative information with the replaced portion of the set of information describing the error.

15. The article of claim 14, wherein determining whether the user is authorized to view the generated error message comprises determining whether the user is an authorized user of the information system.

16. The article of claim 10, wherein the set of false error information comprises information that appears to be meaningfully related to an error that differs from the error associated with the received error message.

17. The article of claim 16, wherein the set of false error information is adapted to mislead the unauthorized user from the error associated with the received error message.

18. The article of claim 16, wherein the set of false error information comprises a set of information associated with a honey-pot system.

19. A system comprising:
   a memory operable to store one or more obfuscation rules associated with a plurality of error messages and obfuscation processing operations; and
   a processor coupled to the memory operable:
      to receive an error message generated in response to an error in the information system, the error message comprising a set of information describing the error;
      to translate the received error message into an obfuscated message, wherein the obfuscated message replaces at least a portion of the set of information describing the error with a set of alternative information, and wherein the set of alternative information describes a set of false error information; and
      to present the obfuscated message to a user via a user interface.

20. The system of claim 19, wherein the processor is further operable:
   to determine whether the user is authorized to view the generated error message; and
   if the user is authorized to view the generated error message, to translate the obfuscated message into the original error message, wherein the original error message replaces the set of alternative information with the replaced portion of the set of information describing the error.

21. The system of claim 19, wherein to translate the received error message into the obfuscated message comprises:
   to apply an obfuscation rule associated with the received error message to the portion of the set of information describing the error to generate the set of alternative information; and
   to replace the set of information describing the error with the set of alternative information.

* * * * *